G. N. BLANCHARD.

AUTOMATIC FUEL CONTROL.

APPLICATION FILED NOV. 21, 1921.

Reissued May 16, 1922. 15,354.

*Inventor.*
*G. N. Blanchard*
*By Cushman Darby & Cushman.*
*his Attorneys.*

UNITED STATES PATENT OFFICE.

GEORGE N. BLANCHARD, OF SAN FRANCISCO, CALIFORNIA, ASSIGNOR TO COLMAR BURNER CO., INC., OF SAN FRANCISCO, CALIFORNIA, A CORPORATION OF CALIFORNIA.

AUTOMATIC FUEL CONTROL.

15,354. Specification of Reissued Letters Patent. Reissued May 16, 1922.

Original No. 1,387,583, dated August 16, 1921, Serial No. 355,361, filed January 31, 1920. Application for reissue filed November 21, 1921. Serial No. 516,859.

*To all whom it may concern:*

Be it known that I, GEORGE N. BLANCHARD, a citizen of the United States, residing in the city and county of San Francisco, State of California, have invented certain new and useful Improvements in Automatic Fuel Controls, of which the following is a specification.

In hydrocarbon burners as at present manufactured the same will flood should the burner flame become accidentally extinguished and no attendant is at hand to shut the flow of fuel off. This danger is serious as should a quantity of fuel collect and the operator be unaware of this escape when igniting the burner, serious results may take place.

The present invention relates to an automatic and automatically operated means for controlling the supply of fuel to a hydrocarbon burner and which is acted on directly by the burner flame whereby fuel is admitted to the burner during such time as the burner is maintained at a predetermined temperature by the burner flame.

The principal object of the present invention is to provide a means preferably associated with the burner generator and controlled by the temperature thereof for permitting a flow of fuel into and through the generator during such time as the generator is at a sufficient temperature to generate the fuel passing therethrough into a gas. A further object is to provide a means whereby the operation of fuel controlling means is capable of being varied in accordance with different temperatures of the generator. A further object is to provide a construction wherein mechanical means are provided for positively shutting off the flow of fuel to the generator at such time as the temperature of the generator falls below a predetermined point.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figures 1, 2:
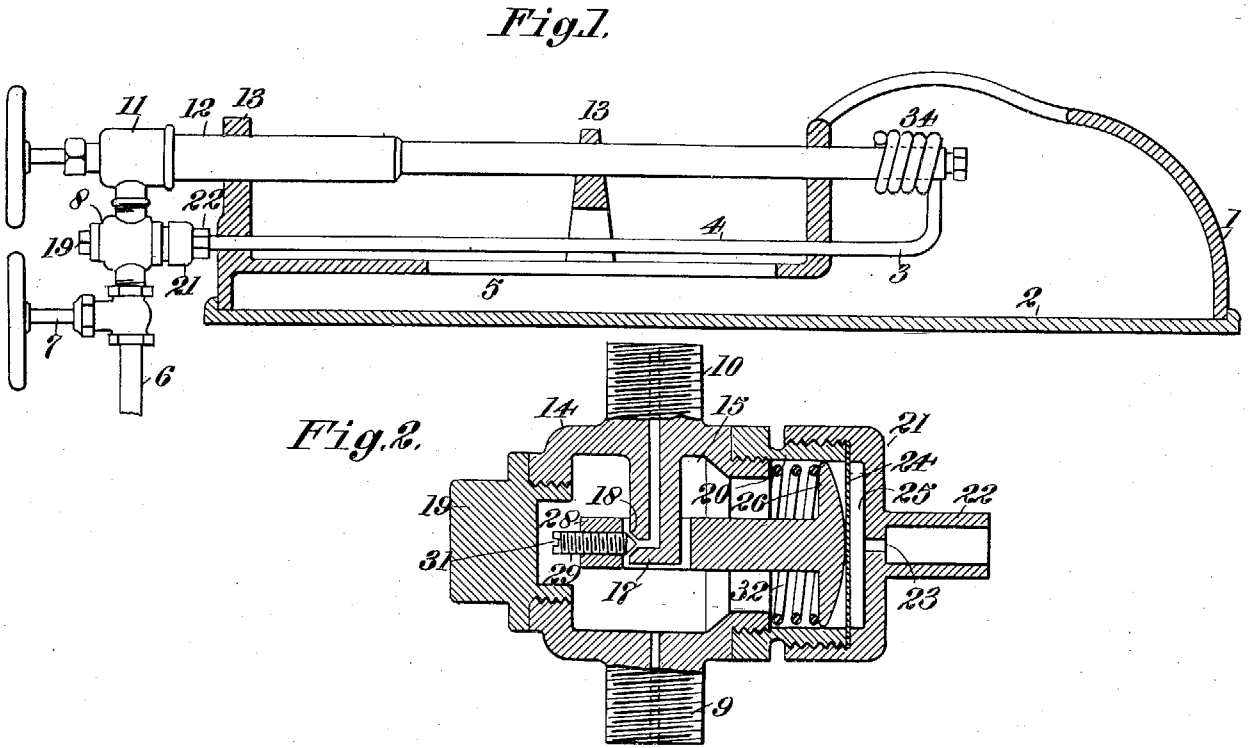
Fig. 1 is a longitudinal sectional view of one form of burner with the preferred embodiment of my invention applied thereto.
Fig. 2 is a vertical detailed sectional view of the controlling valve forming a part of my invention.

Referring more particularly to the drawings, wherein like characters of reference designate corresponding parts, 1 indicates a suitable burner member having a base 2, and formed with an interior mixing chamber 3. The mixing chamber is provided at suitable points with suitable burner openings 4 and the openings 5, for a flame to issue from the burner at a point beneath the generator hereinafter described. Liquid hydrocarbon fuel, preferably under pressure, is supplied to the burner through the pipe 6, preferably controlled by a manually operated valve 7 above which is mounted an automatic valve 8, provided with a fuel inlet opening 9 and outlet opening 10, the outlet opening discharging into a coupling 11 carried on the outer end of a generator 12. The fuel generator 12 is preferably of the conventional tubular construction and is disposed longitudinally of the generator burner openings 5 and above that portion of the burner member 1 adjacent the burner openings, the generator being supported by suitable brackets 13 provided with openings through which the generator projects. At its discharge end, the generator discharges into the mixing chamber 3, thus, it will be apparent that the liquid fuel entering into the generator under pressure is converted by the temperature of the generator which is maintained by the flame through openings 5, into a gas, the major portion of which escapes through the burner openings, not shown. To automatically control the flow of the hydrocarbon fuel through the generator 12 in accordance with the temperature of the generator I employ the following mechanism: The valve 8 is preferably formed with the main body 14 carrying the inlet openings 9 and outlet openings 10, and said body is provided with an interior chamber 15 into which leads a channeled arm 16, connecting at one end with the outlet opening 10 and formed at a point approximately centrally of the chamber 15 with a lateral inlet opening 17 disposed preferably at right angles to the channel in arm 16, and said inlet opening 17 is preferably formed with a valve seat 18. One end of the chamber 15 is adapted to be closed by a removal plug 19 threaded into an opening in the body 14 and to the other open end of the chamber 15 is threaded a coupling 20, to which is in turn threaded a closure cap 21, provided with an outwardly extending nipple 22, said cap being provided with an opening 23 connecting the nipple with the inner wall surface thereof. A suitable diaphragm 24 is held between the end of the coupling 20 and the wall of the closure cap 21 providing a chamber 25 at the outer face of said diaphragm communicating with the interior of the nipple 22 through the opening 23 and closing the interior of the chamber 15, so that the leakage of the liquid fuel admitted thereinto is prevented. Mounted within the chamber 15 is a headed piston 26, the stem 27 of which is slotted for receiving the end of the arm 16, and said stem at the rear end of the slot is provided with a threaded opening 28, within which is threaded a needle-valve 29, the opening 30 of which is adapted for co-operation with the valve seat 18 associated with the lateral arm 16. The outer end of the valve 29 is preferably slotted as at 31 to admit of adjusting the same within the threaded opening 28, at such time as the plug 19 is removed from the body 14. The headed end of the piston 26 is normally maintained in contact with the rear face of the diaphragm 24 by the coiled compression spring 32 to maintain the pointed end 30 of the needle valve 29 in contact with its seat 18. Threaded into the nipple 22 is a suitable tube 33 of relatively small diameter and the same is adapted to extend parallel with and in close proximity to the generator 12 and preferably above the generator burner openings 5. The outer end of the tube 33 is closed and is preferably coiled as at 34 about the discharge end of the generator 12, so that the outer end of the tube will be maintained at approximately the same temperature as the discharge end of said generator 12. The tube 33, chamber 25, opening 23 and interior of the nipple 22 are preferably filled with mercury, thus providing a thermostatic member associated with the automatic valve 8 whereby on the heating of the generator 12 to a predetermined temperature the expansion of the mercury within the tube 33 will operate the diaphragm 24 which will in turn, through the piston 26 release the valve 29 from its seat and permit passage of fuel under pressure from the pipe 6 through the automatic valve 8 and into the generator 12. Should for any reason the temperature of the generator 12 fall below a predetermined degree, the contraction of the mercury within the tube 33 will release the pressure in the tube and chamber 25 and permit the spring 32 to seat the valve 29, cutting off the flow of fuel to the generator until the same is again heated to a sufficient temperature to gasify the liquid fuel admitted thereinto. It will be apparent that the adjustment of the needle valve 29 within the threaded opening 28 controls the sensitiveness of operation of the automatic valve.

While I have illustrated the present invention with a particular form of fuel burner and generator, it is to be understood that such disclosure with the respective burner and generator is merely illustrative and that I am not confined to any particular type of burner or generator, and in my present illustration I have only described such portions of the burner and generator as are absolutely essential in carrying out the invention.

The threading inwardly of the valve 29 draws the piston 26 rearwardly in the chamber 15 requiring greater expansion of the mercury and consequently greater temperature to unseat the needle valve than if the normal position of the piston was forward in the chamber.

Having thus described my invention, what I claim is:—

1. In combination with a generator tube adapted for operative connection at one end with a liquid fuel supply and having at its other end a gas outlet, of a valve for controlling the supply of fuel thereto, a thermostat extending parallel with and in close proximity to said generating tube and surrounding the same at the gas outlet end thereof for controlling the operation of said valve on said tube attaining a predetermined temperature, and means for adjusting said valve to operate at different predetermined temperatures of said tube.

2. In combination with a generator adapted for operative connection at one end with a liquid fuel supply and having at its other end a gas outlet, of a valve for controlling the supply of fuel thereto, a thermostat extending parallel with and in close proximity to said generator and surrounding the same at the gas outlet thereof for controlling the operation of said valve on said generator attaining a predetermined temperature, and means for adjusting said valve to cause the same to operate in accordance with different predetermined temperatures of said generator.

3. In combination with a generator tube adapted for operative connection at one end with a liquid fuel supply and at its other with a gas outlet, of means for controlling the supply of fuel thereto in accordance with the temperature thereof, the same comprising a thermostat tube extending parallel with said generator tube, a valve within said fuel feed pipe and including a casing provided with a fuel passage therethrough, a diaphragm across the casing, a connection between the end of said thermostat tube and said casing at one side of said diaphragm, a piston within said casing at the opposite side of said diaphragm, a needle valve adjustably carried thereby and adapted for operation by the movement of said piston to control the passage of fuel through said passage, a spring for maintaining said piston in contact with said diaphragm, and a closure plug in said casing adapted for removal to permit adjustment of said needle valve.

4. In a device of the character described, the combination of a burner, a generator tube overlying the same and subjected to the heat of said burner and adapted to form a passage for a fluid fuel discharging into said burner, a valve for controlling the supply of fuel to the generator tube, a spring for normally maintaining said valve closed, and a thermostat subjected to a temperature corresponding to that of the generator tube and opposing the pressure of said spring for operating said valve to open on the generator tube attaining a generating temperature.

5. In a device of the character described, the combination of a burner, a generator tube overlying the same and subjected to the heat of said burner and adapted to form a passage for a fluid fuel discharging into said burner, a fuel feed pipe connected with said generator tube, a spring closed valve without the field of the burner for controlling the flow of fuel into the generator tube, and a thermostat acted on by a temperature corresponding to that of said generator tube and connected with said valve to oppose the pressure of the valve closing spring, whereby said valve is maintained open on said generator tube attaining a predetermined temperature.

6. In a device of the character described, the combination of a burner, a generator tube overlying the same and subjected to the heat of said burner and adapted to form a passage for a fluid fuel discharging into said burner, a fuel feed pipe connected with said generator tube, a valve casing through which fuel supplied to said generator tube passes, a valve within said casing for controlling the passage of fuel therethrough, a spring within the casing for normally closing the valve, and a thermostat extended from the casing into proximity to said generator and into a temperature corresponding to that of said generator tube for moving said valve against the action of said spring whereby fuel is supplied to the generator tube on the same attaining a generating temperature.

7. In a device of the character described, the combination of a burner, a generator tube overlying the same and subjected to the heat of said burner and adapted to form a passage for a fluid fuel discharging into said burner, a fuel feed pipe connected with said generator tube, a valve casing through which fuel supplied to said generator tube passes, a valve within said casing for controlling the passage of fuel therethrough, a spring within the casing for normally closing the valve, a thermostat extended from the casing in proximity to said generator and into a temperature corresponding substantially to that of said generator tube, whereby said valve is moved against the action of said spring to supply fuel to the generator tube on the same attaining a generating temperature, and means for varying the spring pressure seating said valve.

8. In combination with a generator having a liquid fuel inlet and a gas outlet, of a valve for controlling the supply of liquid fuel to the generator, a thermostat in thermal contact with the generator for opening said valve on said generator attaining a predetermined temperature, and a spring for closing said valve.

9. In combination with a generator adapted for operative connection with a liquid fuel supply, and having a gas outlet, of a valve for controlling the supply of fuel thereto, a thermostat contacting with said generator for controlling the operation of said valve on said generator attaining a predetermined temperature, and means for adjusting said valve to operate at different temperatures of said generator.

10. In a device of the character described, the combination of a burner, a generator subjected to the heat of said burner and adapted to form a passage for a fluid fuel discharging into said burner, a valve without the field of said burner for controlling the supply of fuel to the generator, a spring for normally maintaining said valve closed and a thermostat contacting with and subjected to a temperature corresponding to that of the generator and opposing the pressure of said spring for operating said valve to open on the generator attaining a predetermined generating temperature.

11. In a device of the character described, the combination of a burner, a generator tube overlying the burner, a fuel inlet at one end of the generator tube, a gas discharge at the opposite end of the generator tube, a valve for controlling the supply of fuel to the inlet, and a thermostat for operating the valve, said thermostat having a portion bent to engage the generator tube whereby the thermostat will be subjected to the same temperature as the generator tube.

12. In a device of the character described, the combination of a burner, a generator tube overlying the burner, a fuel inlet at one end of the generator tube, a gas discharge at the opposite end of the generator tube, a valve for controlling the supply of fuel to the inlet, and a thermostat for operating the valve, said thermostat extending parallel with but spaced from the exterior of the generator tube and having a portion bent to engage the generator tube whereby the thermostat will be subjected to the same temperature as the generator tube.

13. In combination with a generator tube adapted for operative connection at one end with a liquid fuel supply and having at its other end a gas outlet, of a valve for controlling the supply of fuel thereto, and a thermostat extending parallel with and in close proximity to said generator tube and surrounding the same at the gas outlet end thereof for controlling the operation of said valve on said tube attaining a predetermined temperature.

GEORGE N. BLANCHARD.